(12) United States Patent
Kitahara

(10) Patent No.: US 8,427,915 B2
(45) Date of Patent: Apr. 23, 2013

(54) METHOD AND APPARATUS FOR RECORDING INFORMATION IN OPTICAL STORAGE MEDIUM, AND MULTI-LAYER OPTICAL STORAGE MEDIUM

(75) Inventor: Toshiyuki Kitahara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 70 days.

(21) Appl. No.: 12/724,097

(22) Filed: Mar. 15, 2010

(65) Prior Publication Data

US 2010/0238774 A1  Sep. 23, 2010

(30) Foreign Application Priority Data

Mar. 17, 2009  (JP) ................................ 2009-064136

(51) Int. Cl.
*G11B 20/10* (2006.01)
*G11B 7/135* (2012.01)
*G11B 7/00* (2006.01)

(52) U.S. Cl.
USPC ...................... 369/47.5; 369/112.01; 369/117

(58) Field of Classification Search .................. 369/47.5, 369/100, 112.01, 117
See application file for complete search history.

(56) References Cited

U.S. PATENT DOCUMENTS

| | | | |
|---|---|---|---|
| 6,295,262 B1 * | 9/2001 | Kusumoto et al. ......... | 369/53.37 |
| 2003/0081523 A1 | 5/2003 | Miyagawa et al. | |
| 2004/0233826 A1 * | 11/2004 | Sugano ......................... | 369/116 |
| 2005/0249095 A1 * | 11/2005 | Tanaka et al. ................. | 369/103 |
| 2006/0023588 A1 | 2/2006 | Miyagawa et al. | |
| 2006/0187789 A1 * | 8/2006 | Yuzurihara et al. ......... | 369/59.11 |
| 2006/0291360 A1 * | 12/2006 | Maeda et al. ............... | 369/53.23 |
| 2008/0019241 A1 | 1/2008 | Miyagawa et al. | |
| 2009/0323508 A1 * | 12/2009 | Tomura et al. ................ | 369/284 |

FOREIGN PATENT DOCUMENTS

| | | |
|---|---|---|
| JP | 3-283021 | 12/1991 |
| JP | 4-79039 | 3/1992 |
| JP | 2003-178448 | 6/2003 |
| JP | 2004-139638 | 5/2004 |
| JP | 2005-100606 | 4/2005 |
| JP | 2006-048832 | 2/2006 |

OTHER PUBLICATIONS

Japanese Official Action—2009-064136—Jun. 12, 2012.

* cited by examiner

*Primary Examiner* — Aneeta Yodichkas
(74) *Attorney, Agent, or Firm* — Young & Thompson

(57) ABSTRACT

To record information as an array of optically changed portions arranged along a track in an optical storage medium, a pulsed laser beam is emitted toward the optical storage medium while causing at least one of the optical storage medium and the pulsed laser beam to be moved relative to each other. A plurality of pulses of the pulsed laser beam are emitted during a time span in which one segment of the track having a length corresponding to a length of one optically changed portion is scanned with the pulsed laser beam. An intensity of light with which a segment of the track is to be illuminated to form each individual optically changed portion is adjusted by causing a shutter to selectively reduce the number of pulses of the pulsed laser beam with which the segment of the track is to be illuminated.

16 Claims, 5 Drawing Sheets

FIG. 2
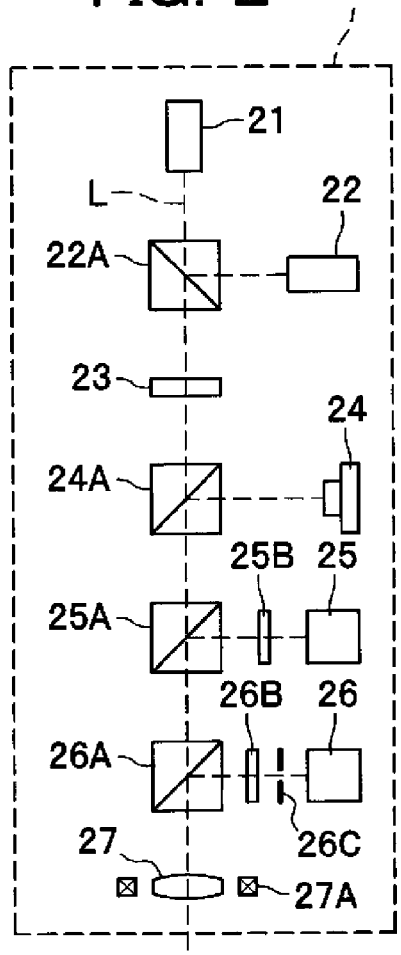
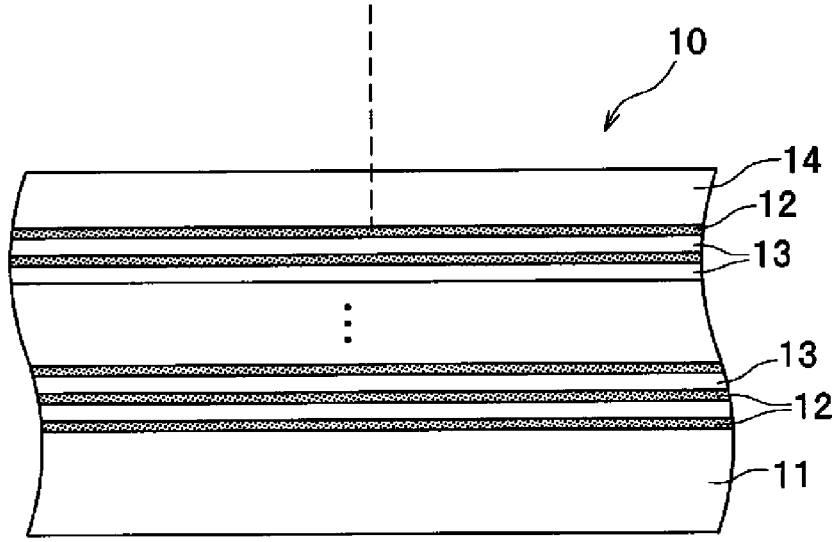

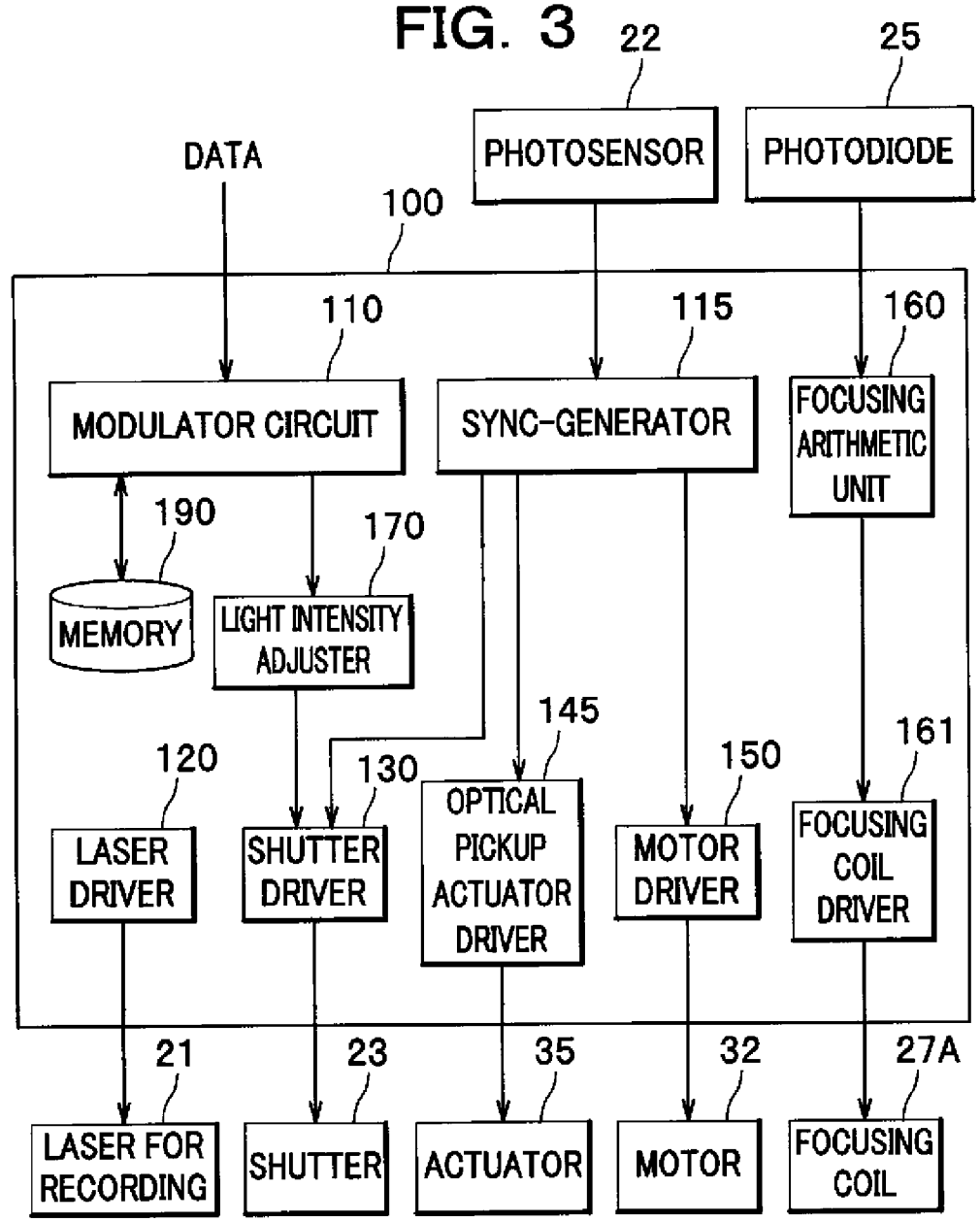

METHOD AND APPARATUS FOR RECORDING INFORMATION IN OPTICAL STORAGE MEDIUM, AND MULTI-LAYER OPTICAL STORAGE MEDIUM

CROSS-REFERENCE TO RELATED APPLICATION(S)

This application claims the foreign priority benefit under Title 35, United States Code, §119 (a)-(d), of Japanese Patent Application No. 2009-064136, filed on Mar. 17, 2009 in the Japan Patent Office, the disclosure of which is herein incorporated by reference in its entirety.

BACKGROUND OF THE INVENTION

1. Field of the Invention

The present invention relates generally to apparatuses and methods for recording information in an optical storage medium, and to multi-layer optical storage media. More specifically, this invention relates to an apparatus and a method for recording information in an optical storage medium using a pulsed laser of which a light intensity is adjustable, and a multi-layer optical storage medium in which information is recorded using such a pulsed laser.

2. Description of Related Art

Optical storage media, such as DVD-R and Blu-ray (registered trademark) discs, in which information is retrievably recordable, typically adopts the dual-layer recording scheme in order to increase the storage capacity. In recent years, to enable recording in more than two layers, a recording method using a two-photon absorption compound has become a focus of study (see JP 2006-48832 A).

The two-photon absorption compound is a compound which absorbs light with electrons excited therein only when two photons simultaneously strike the compound. Therefore, the two-photon absorption compound induces reaction (absorption) with a probability proportional to the square of the intensity of the input light and with high resolution and selectivity in depth of focus. To be more specific, when a laser beam is focused into the optical storage medium having a recording layer containing a two-photon absorption compound, the two-photon absorption compound absorbs (reacts with) the input beam only in a small region around a focused point and never reacts in regions even slightly out of the small region in depth (in the direction of travel of the laser beam). In this way, the two-photon absorption compound is capable of inducing reaction in a small region in depth, and thus a recording layer made of this compound is suitable for recording information in multiple layers.

It is desirable to use a pulsed laser such as a femtosecond laser instead of a hitherto prevalently used continuous-wave laser particularly when an optical storage medium containing a two-photon absorption compound is used to record information therein. This is because the pulsed laser can produce a laser beam having a peak power sufficient to induce two-photon absorption reaction even when it operates at a relatively low average power.

As a pulsed laser for illuminating an optical storage medium, however, a solid-state laser would intrinsically involve a difficulty in having its own output power regulated rapidly. On the other hand, recording of information in a multi-layer optical storage medium would inevitably entail a loss due to absorption (in each layer) and reflection (between adjacent layers) of a laser beam while traveling through the layers deep into an intended layer in which information is to be recorded. Accordingly, it would be desirable to render the intensity of a laser beam for recording changeable according to the depth (of hierarchy) of the intended recording layer. Moreover, if a compound which may be caused by application of light to change into a state with a fluorescing property is adopted as an optical recording material, an excessively high concentration of the fluorescent material produced by application of light during the recording process would possibly result in a lower intensity of the induced fluorescence. With this in view, it would be desirable that the intensity of light to be emitted for recording be adjustable.

The present invention has been made in an attempt to address the above-described problems.

SUMMARY OF THE INVENTION

It is one aspect of the present invention to provide a method and an apparatus for recording information in an optical storage medium using a pulsed laser beam, as well as a multilayer optical storage medium, which makes adjustable an intensity of light to be emitted for recording.

More specifically, according to a method aspect of the present invention, there is provided a method for recording information as an array of optically changed portions arranged along a track in an optical storage medium, using a pulsed laser beam. The method comprises the steps of: emitting the pulsed laser beam toward the optical storage medium while causing at least one of the optical storage medium and the pulsed laser beam to be moved relative to each other, wherein a plurality of pulses of the pulsed laser beam are emitted during a time span in which one segment of the track having a length corresponding to a length of one optically changed portion is scanned with the pulsed laser beam; and adjusting an intensity of light with which a segment of the track is to be illuminated to form each individual optically changed portion, by causing a shutter to selectively reduce the number of pulses of the pulsed laser beam with which the segment of the track is to be illuminated.

With the method configured as described above, when one segment of the track is illuminated with the pulsed laser beam to make it into an optically changed portion, the number of pulses of the pulsed laser beam applied to that segment can be reduced so that the optically changed portion can be formed with an intensity of light adjusted appropriately. For example, one segment of the track corresponding to one optically changed portion can be illuminated with ten pulses, five pulses, or any other number of pulses, and thus the intensity of light of the pulsed laser beam applied to that segment can be adjusted accordingly. Hereupon, the "optically changed portion" refers to a portion illuminated with light and thereby rendered different from the other portions (that are around the illuminated portion and thus have been optically unchanged), in its optical properties such as the index of refraction, absorptivity, wavelength of light to be absorbed, fluorescing property, etc., wherein the portion rendered different includes a portion changed in shape in such a manner that the change in the shape of the recording material leads to the change in the optical properties of the same portion.

An apparatus aspect of the present invention provides an apparatus for recording information as an array of optically changed portions arranged along a track in an optical storage medium. The apparatus comprises a medium support member, a laser light source, a scanning system, a beam-condensing optical system, a shutter and a controller. The medium support member is configured to support the optical storage medium. The laser light source is configured to emit a pulsed laser beam. The scanning system is configured to cause at least one of the medium support member, the laser light source, and the pulsed laser beam emitted from the laser light source to be moved relative to each other, to move an illuminated spot in the optical storage medium supported by the medium support member. The beam-condensing optical system is configured to concentrate the pulsed laser beam emitted from the laser light source into the optical storage medium supported by the medium support member. The shutter is configured to interrupt and resume emission of the pulsed laser beam. The controller comprises a shutter driver and a light intensity adjuster. The shutter driver is configured to drive the shutter. The light intensity adjuster is configured to adjust an intensity of light with which a segment of the track is to be illuminated to form each individual optically changed portion, by causing the shutter driver to cause the shutter to selectively reduce the number of pulses of the pulsed laser beam with which the segment of the track is to be illuminated.

With this apparatus, similar to the method described above, when one segment of the track is illuminated with the pulsed laser beam to make it into an optically changed portion, the number of pulses of the pulsed laser beam applied to that segment can be reduced so that the optically changed portion can be formed with an intensity of light adjusted appropriately.

In the aforementioned aspects of the present invention, the pulsed laser beam may comprise ultrashort light pulses.

In any of the above configurations, part of the pulsed laser beam emitted toward the optical storage medium may be used to produce a detection signal, and a synchronizing signal may be generated based upon the detection signal, so that the shutter operates in synchronization with timing, represented by the synchronizing signal. In one specific embodiment, the apparatus as consistent with the apparatus aspect of the present invention as described above may further comprise a beam splitter and a photosensor, whereas the controller may further comprise a sync-generator. The beam splitter is configured to cause part of the light beam emitted from the laser light source to be deviated from a light path extending toward the optical storage medium supported by the medium support member. The photosensor is configured to receive the part of the light beam deviated by the beam splitter to produce a detection signal. The sync-generator is configured to receive the detection signal from the photo sensor and to generate a synchronizing signal based upon the received detection signal, and the shutter driver is configured to drive the shutter in synchronization with timing represented by the synchronizing signal generated by the sync-generator.

With these additional features for synchronization, the shutter is driven in synchronization with the timing represented by the synchronizing signal generated based upon the detection of pulses of the pulsed laser beam, and thus can be caused to operate in synchronization with the pulsation of the pulsed laser beam.

In still another aspect of the present invention, there is provided a multi-layer optical storage medium comprising a substrate, a plurality of optical recording layers in which information is recordable and at least one intermediate layer each interleaved between adjacent optical recording layers. In this multi-layer optical storage medium, light intensity information indicative of an intensity of light specified for each of the optical recording layers is recorded. Thus, the light intensity information which is a signal indicative of the intensity of light specified for each of the optical recording layers can be retrieved from the optical storage medium, so that the shutter is driven in accordance with the retrieved light intensity information.

With this aspect of the present invention, each recording layer may be illuminated with light having a relevant intensity as specified in the light intensity information, so that information can be recorded with an appropriate intensity of light.

In the multi-layer optical storage medium configured as described above, the optical recording layers may comprise an optical recording material that contains a two-photon absorption compound and a dye precursor, such that energy obtained through a two-photon absorption reaction by the two-photon absorption compound in response to illumination with light causes the dye precursor to be converted into a dye having a fluorescing property.

With this type of the multi-layer optical storage medium, illumination with a pulsed laser beam induces the two-photon absorption reaction in the two-photon absorption compound, and the energy obtained through this reaction causes the dye precursor to be converted into a dye having a fluorescing property. In the process of recording, the illumination with light with an appropriate intensity according to the light intensity information recorded in advance can be carried out, and thus an undesirable lowering of the intensity of the induced fluorescence due to an excessively high concentration of the fluorescent dye material which would result from too intense light illumination can be prevented, so that information can be retrieved more reliably from the multi-layer optical storage medium.

According to the aspects and specific embodiments of the present invention, which may be implemented in an apparatus or method for recording information in an optical storage medium, as will be described below, the intensity of the pulsed laser beam to be applied for recording information can be rendered adjustable. According to another aspect of the present invention, which may be implemented in a multi-layer optical storage medium, illumination with the pulsed laser beam can be carried out with an intensity thereof adjusted appropriately in accordance with the light intensity information retrieved therefrom which is indicative of the intensity of light specified for each of the optical recording layers.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which:

FIG. 2 is a schematic diagram of an optical pickup of the optical disc drive and an enlarged section of an optical disc;

FIG. 3 is a block diagram of a controller of the optical disc drive;

DETAILED DESCRIPTION OF THE EXEMPLARY EMBODIMENTS

A detailed description will be given of the exemplary embodiments of the present invention with reference to the drawings. In the following description, an optical disc drive for recording or retrieving data (information) in an optical disc is taken as an example of an apparatus for recording information in an optical storage medium according to one exemplary embodiment of the present invention.

Figure 1:
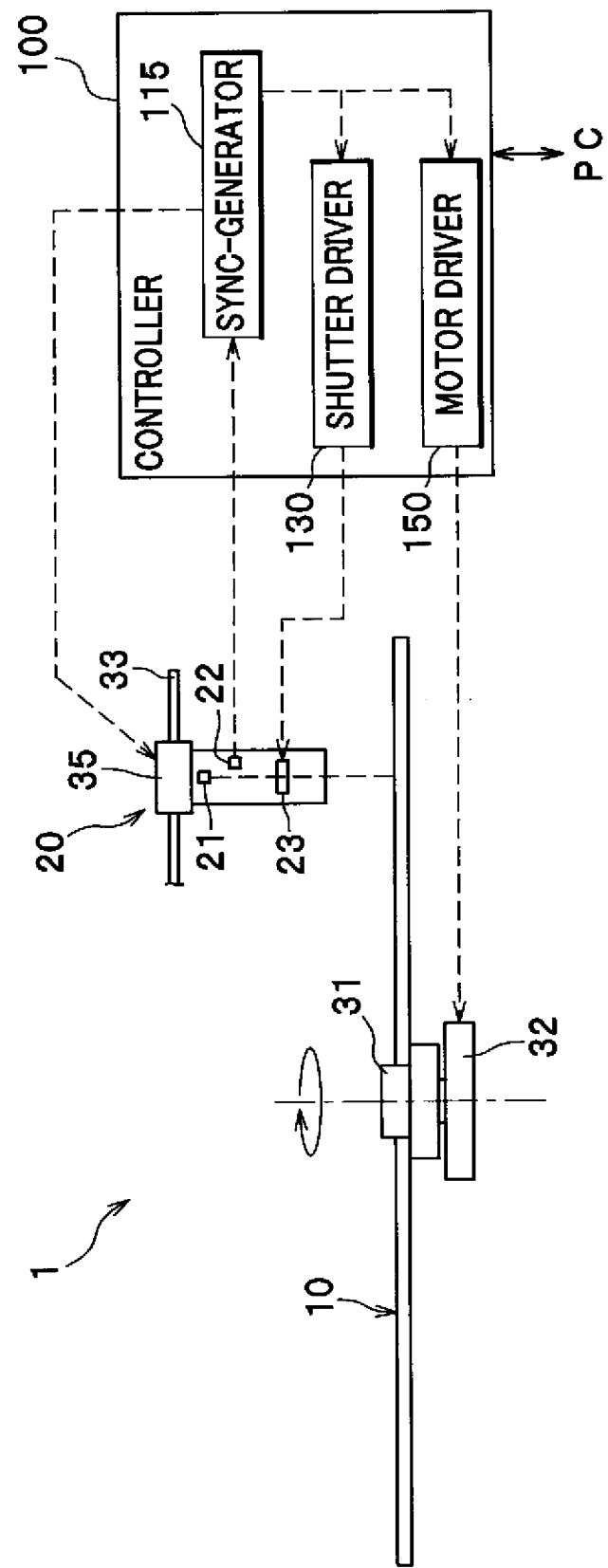
FIG. 1 is a schematic diagram showing an optical disc drive according to an exemplary embodiment of the present invention.

As shown in FIG. 1, an optical disc drive 1 is an apparatus for optically recording information (data) received from a computer (PC) or the like in an optical disc 10, and principally includes a spindle 31 as one example of a medium support member configured to support an optical disc 10 (optical storage medium), a motor 32 configured to rotate the spindle 31, an optical pickup 20, a guide 33 configured to guide the movement of the optical pickup 20 along a path extending parallel to the direction of a radius of the optical disc 10, an actuator 35, and a controller 100. The motor 32, the guide 33 and the actuator 35 are configured to operate together in harmony and constitute one example of a scanning system as consistent with the present invention.

As shown in FIG. 2, the optical disc 10 as one example of a multi-layer optical storage medium comprises a substrate 11, a plurality of recording layers 12 and a plurality of intermediate layers 13, and a cover layer 14. The recording layers 12 and the intermediate layers 13 each interleaved between adjacent recording layers 12 are provided on top of the substrate 11, and the cover layer 14 is provided on top of these layers 12, 13.

The substrate 11 is a plate supporting the recording layers 12 and the intermediate layers 13, and made of a plastic plate, a glass plate, a metal plate, a semiconductor plate, or the like.

The recording layer 12 is a layer which contains a two-photon absorption compound and a dye precursor. The two-photon absorption compound induces a two-photon absorption reaction in response to illumination with light, and energy obtained through the two-photon absorption reaction causes the dye precursor to be converted into a dye having a fluorescing property. The two-photon absorption compound is a compound which absorbs light by excitation of electrons only if two photons enter the compound simultaneously (to be more exact, within an extremely short period of time). The two-photon absorption compound usable for implementing the present invention may include a cyanine dye, for example.

The dye precursor becomes a dye having a fluorescing property by the energy obtained by the two-photon absorption compound in the process of recording information, and the dye absorbs a laser beam applied for retrieval and induces fluorescence in the process of retrieving information. The dye precursor usable for implementing the present invention may include an oxazine leuco compound, for example. The term "dye" as used herein refers to a compound that has absorption of the light applied thereto.

In implementing the method and apparatus for recording information as consistent with the present invention, the optical storage medium may not necessarily be a multi-layer optical storage medium which comprises a plurality of optical recording layers. Moreover, the two-photon absorption compound and the dye precursor as materials of the optical recording layer(s) 12 may not be indispensable prerequisites therefor. For example, as materials of the optical recording layer(s) 12, any other recording material may be used which is capable of responding to illumination with a laser beam for recording, and changing its index of refraction and/or absorptivity or developing color. Alternatively, a recording material which contains no dye precursor but contains a two-photon absorption compound capable of changing its index of refraction and/or absorptivity by the two-photon absorption reaction may be used, instead. The two-photon absorption compound usable in this instance may include a diarylethene.

Each intermediate layer 13 is interleaved between adjacent recording layers 12. The intermediate layers 13 are provided to prevent interlayer crosstalk between the respective adjacent recording layers 12, and thus may have thicknesses sufficient to prevent such interlayer crosstalk. The material for use in the intermediate layers 13 may be selected without limitation from those which would not affect laser beams applied for recording or retrieval. The material which can be used for the intermediate layers 13 includes, for example, a composition containing a polymer having a glass transition temperature Tg not higher than ambient temperature, as produced by loosely cross-linking with isocyanate a polymer of a molecular weight not lower than 100,000 comprising polyvinyl alcohol, acrylic acid and acrylic ester.

The cover layer 14 is a layer which protects the recording layers 12 and the intermediate layers 13, and is made of any material which can transmit a laser beam applied in the recording and retrieving operations. For example, the cover layer 14 may be made of resin or glass.

The optical disc 10 may be provided with one or more other layers such as a reflecting layer and an antireflection coating, where appropriate.

The optical disc 10 has a specific recording layer 12 in which information indicative of an optimum intensity of light to be applied as specified for each recording layer 12 (hereinafter referred to "light intensity information") is recorded. The light intensity information is recorded, for example, as the percentage (e.g., 100 percent, 50 percent or the like) of the number of pulses to be applied actually to each relevant recording layer 12 to the total number of pulses which can be applied thereto at the maximum. The light intensity information may be recorded in any form and in any portion of the optical disc 10 as long as the information can be retrievably recordable therein which portion may not be in the recording layer 12. For example, the light intensity information may be recorded as a series of pits arranged in the reflecting layer.

In the optical disc drive 1, the optical pickup 20 includes a laser 21 for recording, as one example of a laser light source, a photosensor 22, a beam splitter 22A, a shutter 23, a laser 24 for retrieval, a dichroic mirror 24A, a photodiode 25, a beam splitter 25A, a high-pass filter 25B, a photosensor 26 for retrieving recorded information, a beam splitter 26A, a low-pass filter 26B, a pinhole plate 26C, an objective lens 27, and a focusing coil 27A.

The laser 21 is a pulsed laser which periodically emits a laser beam for recording information in an optical disc 10, and may preferably but not necessarily be a femtosecond laser which is capable of emitting a strong laser beam for an extremely short period of time, in view of its increased recording density and its improved efficiency in inducing a two-photon absorption reaction. The femtosecond laser may preferably but not necessarily be a solid-state laser which produces ultrashort pulses having a pulse repetition frequency of 1 GHz or greater, a wavelength of 500-550 nm, a peak power of 100 W or greater, and a pulse width of 1 psec or smaller. This pulse repetition frequency is greater than the recording data rate. Here, the recording data rate is a data writing speed (the number of data bits per unit time) at which information is recorded into the medium. Since the laser 21 in this embodiment is a solid-state laser, the laser 21 by itself is unable to provide fine adjustments of high-frequency pulse emission, pulse-emission timing, or emission power control. In the present embodiment, control over the shutter 23, which is described later in detail, is performed to achieve these functions.

The beam splitter 22A is provided downstream of the laser 21 along a path to be traveled by a pulsed laser beam L emitted from the laser 21, and configured to cause part of the pulsed laser beam L to be deviated from a light path extending toward the optical disc 10, so as to enter the photosensor 22.

The photosensor 22 is disposed to receive the part of the pulsed laser beam L deviated by the beam splitter 22A to produce a detection (intensity) signal which is then outputted to the controller 100.

The shutter 23 comprises an acoustooptic modulator (AOM) element, and is configured to diffract and deflect the received pulsed laser beam L by ultrasonic vibrations given by the AOM so that any pulse of the pulsed laser beam L may selectively be interrupted by changing the direction of travel of the outgoing pulsed laser beam L. Alternatively, the shutter 23 may comprise an element consisting of an electrooptic modulator (EOM) instead of the AOM.

The laser 24 for retrieval is a continuous-wave laser which may be driven under control of the controller 100.

The dichroic mirror 24A is located, in such a position that the dichroic mirror 24A receives a laser beam emitted from the laser 24, along the path to be traveled by the pulsed laser beam L emitted from the laser 21 toward the optical disc 10, and is configured to selectively reflect the laser beam emitted from the laser 24 and direct the same toward the optical disc 10.

The photodiode 25 is an element configured such that for the purpose of servo control by which a laser beam emitted for recording or retrieval is focused in a desired recording layer 12, part of the laser beam which has entered the optical disc 10 and is reflected back at an interface between the recording layer 12 and the intermediate layer 13 in the optical disc 10 is detected. The photodiode 25 may comprise a quadrant photodiode having four light-sensitive surfaces, for example. The photodiode 25 outputs a detection signal, which is to be received by the controller 100.

The beam splitter 25A is located along the path to be traveled by the pulsed laser beam L emitted from the laser 21, and configured to cause part of the light reflected back from the optical disc 10 to be directed toward the photodiode 25.

The high-pass filter 25B is a filter optionally provided between the beam splitter 25A and the photodiode 25. The high-pass filter 25B located to receive light coming back from the optical disc 10 is configured to transmit reflected light having relatively short wavelengths (i.e., higher frequencies) and interrupt fluorescent light having relatively long wavelengths (i.e., lower frequencies).

The photosensor 26 is an element disposed to receive fluorescent light emitted from the recording layer 12 in the process of retrieving information to produce a detection signal which is then outputted to the controller 100. The photosensor 26 may comprise a highly light-sensitive detector, for example, using a photomultiplier tube (PMT) or an avalanche photodiode (APD).

The beam splitter 26A is located along the path to be traveled by the pulsed laser beam L emitted from the laser 21, and configured to cause part of the light reflected back from the optical disc 10 to be directed toward the photosensor 26.

The low-pass filter 26B is a filter optionally provided between the beam splitter 26A and the photosensor 26. The low-pass filter 26B located to receive light coming back from the optical disc 10 is configured to transmit the fluorescent light that is light having relatively long wavelengths (i.e., lower frequencies) and interrupt the reflected light that is light having relatively short wavelengths (i.e., higher frequencies). It would be preferable that the low-pass filter 26B be provided in cases where any other means for discriminating the fluorescent light from other light coming back from the optical disc 10 (e.g., polarizing filter, or the like) is not provided, because the intensity of fluorescent light is lower by far than the reflected light.

The pinhole plate 26C is a plate having a pinhole of about 5 micrometers in diameter, and is optionally provided between the low-pass filter 26B and the photosensor 26. The pinhole of the pinhole plate 26C is located in close vicinity of, preferably exactly at, a focal point of the fluorescent light that has passed through the low-pass filter 26B. A component of the light that has passed through the low-pass filter 26B but failed to come into focus within the pinhole will be interrupted by the pinhole plate 26C, and thus the signal-to-noise ratio of the fluorescent light detected as a signal is increased.

The objective lens 27 as one example of a beam-condensing optical system is a lens which is located downstream of the beam splitter 26A along the path to be traveled by the pulsed laser beam L emitted from the laser 21, and is configured to converge (concentrate) the pulsed laser beam L so as to make the pulsed laser beam L focused in a recording layer 12.

The focusing coil 27A is disposed adjacent to the objective lens 27, and configured to adjust the position of the objective lens 27 in accordance with a driving signal from the controller 100 (focusing coil driver 161 shown in FIG. 3) so that the pulsed laser beam L is focused on a spot in a desired recording layer 12 of the optical disc 10.

The optical pickup 20 as described above is configured to be moved along the guide 33, i.e., along a path extending parallel to the direction of a radius of the optical disc 10 (turned by the motor 32), by the actuator 35 of which a specific mechanism is known in the art. The actuator 35 and the guide 33 together with the motor 32 for rotating the optical disc 10 constitute a scanning system in the present embodiment.

As shown in FIG. 3, the controller 100 receives data to be recorded, and controls the laser 21, shutter 23, actuator 35, motor 32 and focusing coil 27A, based upon the signals received from the photosensor 22 and the photodiode 25. The controller 100 includes a modulator circuit 110, a sync-generator 115, a laser driver 120, a shutter driver 130, an optical pickup actuator driver 145, a motor driver 150, a focusing arithmetic unit 160, a focusing coil driver 161, a light intensity adjuster 170, and a memory 190. Each unit of the controller 100 may be composed of a dedicated circuit, or implemented by execution of a program on a computer which includes a CPU, a ROM, a RAM and other components.

The modulator circuit 110 is a circuit which modulates data to be recorded, into digital data (hereinafter referred to as "pit array data") indicative of an array of optically changed portions (which portions actually are not necessarily shaped like hollows or pits, but herein called "pit(s)" as has customarily been used to call the similar portions in CD and like other storage media) arranged along a track in the optical disc 10. The modulator circuit 110 may be composed of an EFM (eight-to-fourteen modulation) modulator circuit known in the art. The pit array data is outputted to the light intensity adjuster 170.

The sync-generator 115 is a circuit configured to receive a detection signal indicative of intensity of light detected by the photosensor 22 and to generate a synchronizing signal with the same timing (i.e., at the same frequency) as that of the received detection signal (intensity signal). This synchronizing signal is used to synchronize the operations of the shutter driver 130, the optical pickup actuator driver 145 and the motor driver 150.

The sync-generator 115 may be realized through the use of a phase locked loop (PLL) circuit known in the art. The PLL circuit is a circuit which is configured to receive a signal having a reference frequency, and to generate an oscillation signal having a frequency which is N times the reference frequency. The PLL circuit consists essentially of a phase detector, a loop filter, a voltage-controlled oscillator (VCO), and a frequency divider.

The laser driver 120 is a known element which generates and sends to the laser 21 a driving signal for causing the laser 21 to emit a laser beam.

The shutter driver 130 is a device which drives the shutter 23 in accordance with a shutter control signal received from the light intensity adjuster 170. The operation of the shutter driver 130 is controlled in such a manner that the shutter 23 operates in synchronization with timing represented by a synchronizing signal received from the sync-generator 115.

The optical pickup actuator driver 145 is a device similar to that which is implemented in a known optical disc drive, and is configured to drive the actuator 35 at predetermined speeds in such a manner that a recording track is formed spirally in the optical disc 10. The optical pickup 20 is thus caused to gradually move radially from an inner edge of the optical disc 10 outward or from an outer edge of the optical disc 10 inward. The optical pickup actuator driver 145 receives a synchronizing signal from the sync-generator 115, and the speed of the radial movement of the optical pickup 20 actuated by the actuator 35 is regulated in accordance with the synchronizing signal.

The motor driver 150 is a known device which drives the motor 32 to rotate the optical disc 10. The motor driver 150 receives a synchronizing signal from the sync-generator 115, and the rotation speed of the optical disc 10 is regulated in accordance with the synchronizing signal. To be more specific, the rotation cycle of the motor 32 is adjusted in such a manner that a period of time of one rotation of the motor 32 is phased with an integral multiple of that represented by the synchronizing signal generated by the sync-generator 115. This configuration may be established, by way of example, with a stepping motor adopted as the motor 32 and a frequency divider configured to output a driving pulse signal having a frequency which is an integral submultiple of that of the synchronizing signal, so that the motor driver 150 applies the driving pulse signal to a control circuit of the motor 32.

The rotation speed of the motor 32 driven by the motor driver 150 may be regulated such that pulses of the regularly pulsed laser beam L striking the optical disc 10 will circumferentially overlap each other. With this configuration, the length of each pit can be adjusted by varying the number of pulses which will reach the optical disk 10 without interruption. In this way, several pits of varying length can be formed appropriately.

The rotation speed of the motor 32 may preferably be regulated such that a plurality of pulses of the pulsed laser beam L are emitted even during a time span in which the shortest track segment is scanned with the pulsed laser beam L to form the shortest pit. This configuration enables the light intensity adjustment by reducing the number of pulses with which the shortest track segment is scanned, even when the shortest pit is to be formed.

The focusing arithmetic unit 160 is a device which receives a signal indicative of receipt of light from the photodiode 25 and calculates the amount of control over the objective lens 27 for focusing the beam. The focusing arithmetic unit 160 is configured to calculate the amount of control, for example, using a known astigmatic method or any other method. The result of calculation is outputted to the focusing coil driver 161.

The focusing coil driver 161 is a device which provides a driving signal to the focusing coil 27A in accordance with the amount of control calculated in the focusing arithmetic unit 160.

The light intensity adjuster 170 is a device which generates a shutter control signal in accordance with the pit array data received from the modulator circuit 110, and provides the shutter control signal to the shutter driver 130. The light intensity adjuster 170 is configured to shorten the time for which the shutter 23 is opened so that the number of pulses is reduced (as if the pulses are culled or thinned out by cancelling some of them) with a specific percentage adjusted in accordance with the relevant intensity of light specified for each recording layer which has been retrieved from the optical disc 10.

Figure 4A:
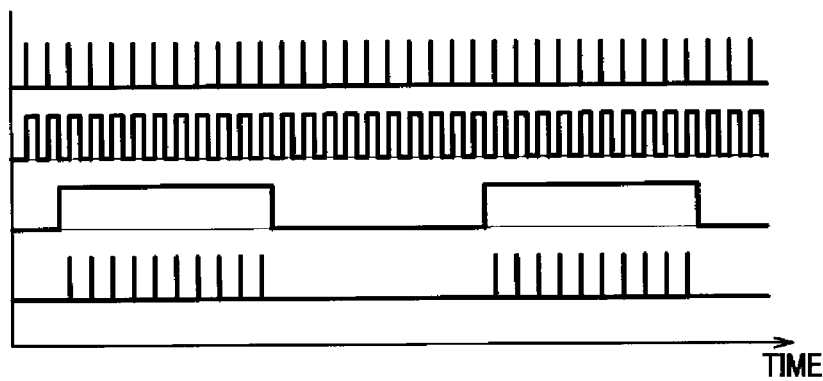
FIG. 4A is a graph showing waveforms of a detection signal output from a photosensor, a synchronizing signal, a shutter control signal, and a laser beam applied, with the intensity of illumination being 100%.
Figure 4B:
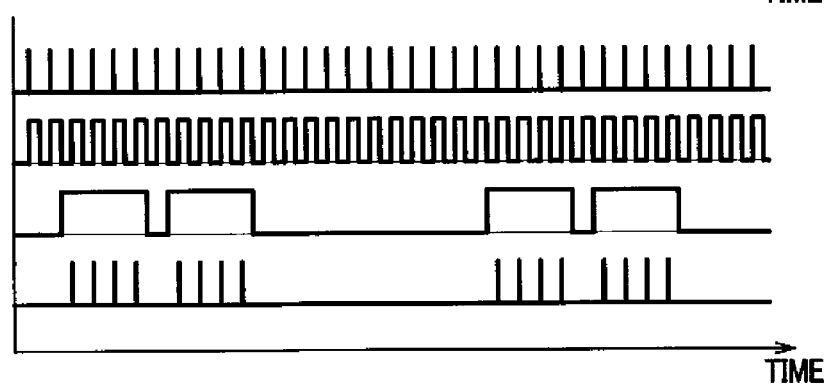
FIG. 4B is a graph showing waveforms of the detection signal output from the photosensor, the synchronizing signal, the shutter control signal, and the laser beam applied, with the intensity of illumination being 80%.
Figure 4C:
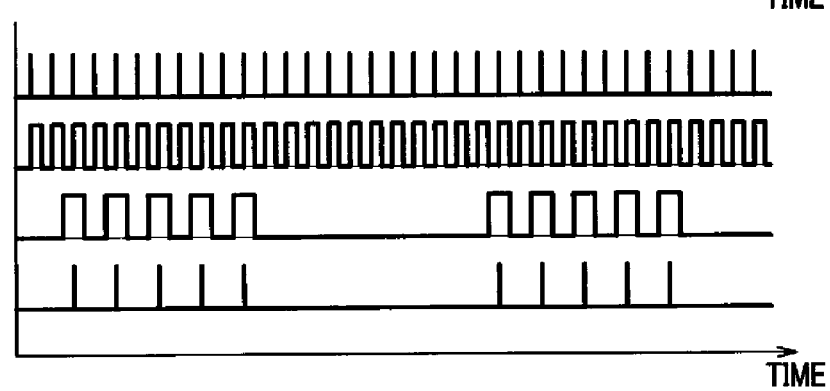
FIG. 4C is a graph showing waveforms of the detection signal output from the photosensor, the synchronizing signal, the shutter control signal, and the laser beam applied, with the intensity of illumination being 50%.

For example, as shown in FIGS. 4A, 4B and 4C where the shutter 23 is opened during periods of time when the shutter control signals (corresponding to the respective intensities of light, 100%, 80% and 50%) are ON, the shutter control signals are modulated such that the time for which the shutter 23 is opened is made shorter according as the intensity of light to be applied is lower.

The memory 190 is a storage space capable of storing data for use in the controller 100 performing operations, such as modulation in the modulator circuit 110, where appropriate.

The operation of the optical disc drive 1 configured as described above will now be described in detail.

At the outset, the controller 100 drives the laser 24 for retrieval, reads out information indicative of the intensity of light to be applied to each of the recording layers 12 from a predetermined position in a specific recording layer 12, and stores the information in the memory 190.

When information is to be recorded in the optical disc 10, data inputted to the controller 100 from a computer (PC) or the like is modulated by the modulator circuit 110 into pit array data.

The laser driver 120 drives the laser 21, and causes a pulsed laser beam L to be emitted from the laser 21. Meanwhile, the motor driver 150 rotates the motor 32 at predetermined rotation speeds, so as to rotate the optical disc 10.

The controller 100 waits, before starting a recording operation, until the rotation speed (rotation cycle) of the motor 32 and the pulsed laser beam L are synchronized. At this stage, the pulsed laser beam L generated by the laser 21 is split by the beam splitter 22A in which part of the pulsed laser beam L is caused to deviate toward, and received by, the photosensor 22. The photosensor 22 produces a detection signal which is indicative of a voltage varying according to the amount of light received by the photosensor 22 (see FIGS. 4A-4D), and provides the output detection signal to the controller 100. In the controller 100, the sync-generator 115 receives this detection signal, and generates an oscillation signal (synchronizing signal, see FIGS. 4A-4D) based upon the received detection signal, and provides the oscillation signal to the shutter driver 130, the optical pickup actuator driver 145, and the motor driver 150.

The motor driver 150 generates a motor control signal having a period or cycle which is an integral multiple of a time interval represented by the synchronizing signal, using a frequency divider (not shown) in which the frequency of the output signal is an integral submultiple of the input frequency of the synchronizing signal. The motor driver 150 thus provides the motor control signal to the control circuit of the motor 32, so that the rotation cycle of the motor 32 is phased with an integral multiple of the time interval represented by the synchronizing signal.

When the rotation speed of the motor 32 becomes stable, the optical pickup actuator driver 145 of the controller 100 causes the optical pickup 20 to move to a position in which a pulsed laser beam L produced and directed to the optical disc 10 will strike a recordable region of the optical disc 10 (i.e., region in which information has not yet been recorded). Then, the pulsed laser beam L reflected back from the optical disc 10 is received by the photodiode 25, and the focusing arithmetic unit 160 works out the amount of control for focusing the beam based upon the detection signal received from the photodiode 25. The focusing coil 27A driven by the focusing coil driver 161 based upon the amount of control calculated in the focusing arithmetic unit 160 causes the pulsed laser beam L to be focused on a desired position within an appropriate recording layer 12 of the optical disc 10. Meanwhile, the laser driver 120 is operated to cause the laser 21 to continue its periodical pulse emission of a pulsed laser beam L, but before the recording operation is started, the pulsed laser beam L is interrupted by the shutter 23.

On the other hand, the light intensity adjuster 170 retrieves a piece of the light intensity information stored in the memory 190 which corresponds to the depth of hierarchy of the recording layer 12 in which information is currently to be recorded, and selectively reduces the number of pulses of the pulsed laser beam L by removing one or more pulses from a plurality of pulses emitted to form each pit (having a unit length of one optically changed portion) in the pit array data, to generate a pulse signal (shutter control signal), wherein the ratio of the number of pulses not removed to the total number of the plurality of pulses emitted for each pit corresponds to the ratio indicated by the retrieved piece of relevant light intensity information. The shutter control signal generated by the light intensity adjuster 170 is provided to the shutter driver 130.

The shutter driver 130 drives the shutter 23 in accordance with shutter control signal generated by the light intensity adjuster 170. The operation of the shutter 23 is such that emission of the regularly pulsed laser beam is interrupted to cancel specific pulses of the pulsed laser beam. Therefore, the times of interruption should coincide with the times at which the leading or trailing edges of the pulses of light come to the shutter 23. In the optical disc drive 1 according to the present embodiment, a synchronizing signal is generated based upon the detection signal produced by the photosensor 22 from the pulsed laser beam L, and the operation of the shutter 23 is synchronized with the timing represented by this synchronizing signal. Thus, the timing of interruption by the shutter 23 can be synchronized with the timing of pulsing of the pulsed laser beam L. For example, the shutter driver 130 drives the shutter 23 in such a manner that the shutter 23 opens and closes at times corresponding to the trailing edges of the pulses of the synchronizing signal, as shown in FIGS. 4A-4D.

In this way, the pulsed laser beam L directed to the recording layer 12 of the optical disc 10 is concentrated in an information recordable layer therein (see LASER BEAM APPLIED in FIGS. 4A-4D; Note that the "laser beam applied" refers to a laser beam which reaches the recording layer 12 of the optical disc 1), and the two-photon absorption reaction takes place selectively in the regions in which the laser beam is concentrated, whereby the dye precursor in the recording layer 12 is converted into a dye having a fluorescing property. As a result, a region in which information has been recorded (i.e. a region in which pits P as shown in FIGS. 5A-5D are formed with portions having a fluorescing property) is formed in the recording layer 12.

Figure 5A:
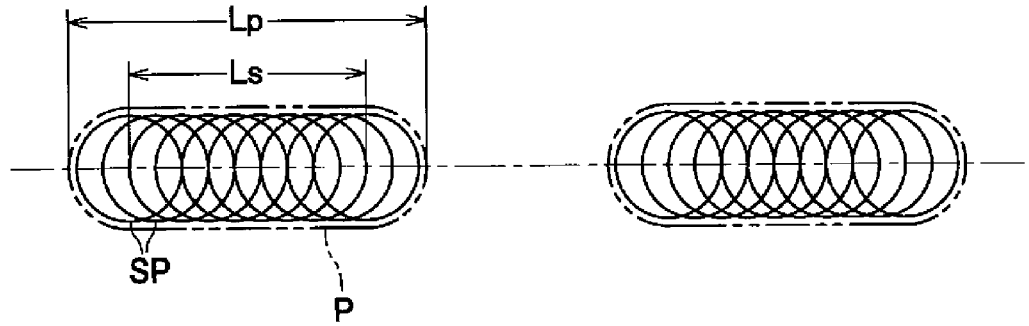
FIG. 5A is a diagram showing optically changed portions formed with the intensity of illumination being 100%.

The intensity of illumination of a pulsed laser beam L applied to form pits P will now be described with reference to FIGS. 4A-4C and 5A-5C. As shown in FIGS. 4A and 5A, when the recording layer 12 is to be illuminated with a 100% intensity of light to form each pit P, a shutter control signal is generated such that, assuming that a plurality of (e.g., ten) pulses of the pulsed laser beam L are emitted during a time span in which one segment of the track having a length Ls corresponding to a length Lp of one pit P is scanned with the pulsed laser beam L, the shutter 23 is opened uninterruptedly during the time span so that all the pulses (ten pulses) are applied to the relevant segment of the track. In this way, the laser beam applied for one pit P contains ten uninterrupted pulses in the present embodiment as shown in FIG. 4A, and ten continuous illuminated spots SP form one pit having a pit length Lp as shown in FIG. 5A.

Figure 5B:
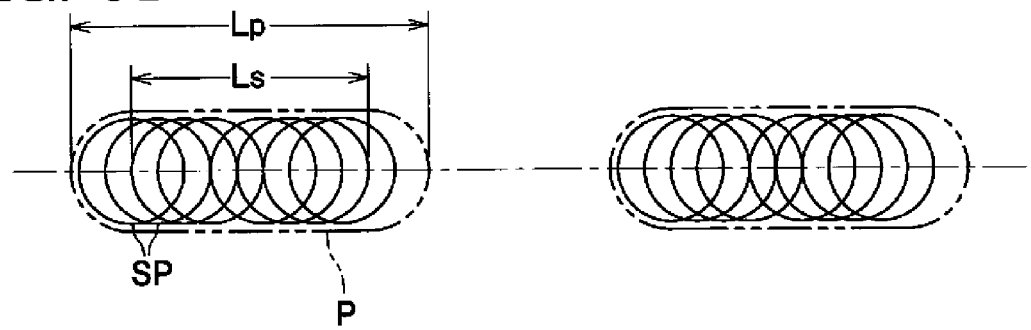
FIG. 5B is a diagram showing optically changed portions formed with the intensity of illumination being 80%.

As shown in FIGS. 4B and 5B, when the recording layer 12 is to be illuminated with a 80% intensity of light to form each pit P, ten pulses in this embodiment of the pulsed laser beam L are emitted during the time span in which one segment of the track having the length Ls corresponding to the length Lp of one pit P is scanned with the pulsed laser beam L, and the shutter 23 is opened and closed during the time span so that eight pulses of all the pulses are applied to the relevant segment of the track. To be more specific, a shutter control signal is generated such that a cycle of operation is repeated twice in which one cycle the shutter 23 is opened uninterruptedly during a shortened time span to allow only the four pulses to be applied to the recording layer 12 and then closed in a subsequent time span enough to interrupt one pulse. In this way, the laser beam applied for one pit P contains eight pulses (the number of pulses is reduced by two from ten to eight) as shown in FIG. 4B, and eight continuous illuminated spots SP form one pit having substantially the same pit length Lp as shown in FIG. 5B.

Figure 5C:
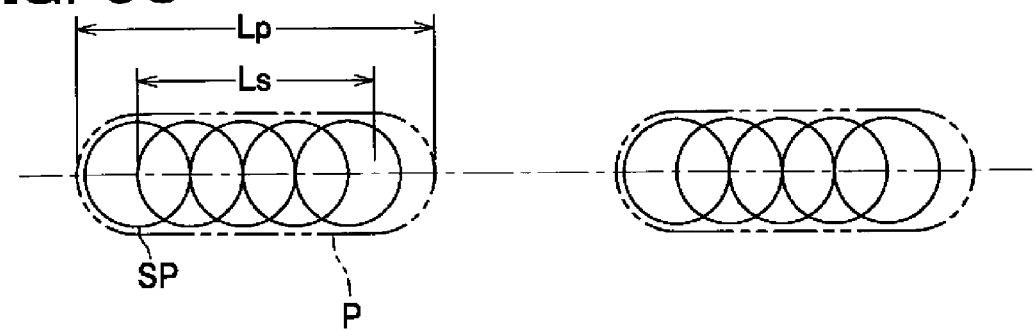
FIG. 5C is a diagram showing optically changed portions formed with the intensity of illumination being 50%.

As shown in FIGS. 4C and 5C, when the recording layer 12 is to be illuminated with a 50% intensity of light to form each pit P, ten pulses in this embodiment of the pulsed laser beam L are emitted during the time span in which one segment of the track having the length Ls corresponding to the length Lp of one pit P is scanned with the pulsed laser beam L, and the shutter 23 is opened during the time span intermittently so that five pulses of all the pulses are applied to the relevant segment of the track. To be more specific, a shutter control signal is generated such that the shutter 23 is opened during a time span enough to allow one pulse to be applied to the recording layer 12 and then closed in a subsequent time span enough to interrupt one pulse; that is, pulses are interrupted every alternate pulse. In this way, the laser beam applied for one pit P contains five pulses (the number of pulses is reduced by five from ten to five) as shown in FIG. 4C, and five continuous illuminated spots SP form one pit having substantially the same pit length Lp as shown in FIG. 5C.

As described above, according to the present embodiment as implemented in the optical disc drive 1 and in the method for recording information using the optical disc drive 1, a plurality of pulses of the pulsed laser beam L are emitted during a time span in which one segment of the track having a length Ls corresponding to a length Lp of one pit P is scanned with the pulsed laser beam L, and an intensity of light with which a segment of the track is to be illuminated to form each pit P is adjusted, by selectively reducing the number of pulses of the pulsed laser beam L with which the segment of the track having the length Ls is to be illuminated during the time span. Accordingly, even in cases where the laser 21 for recording is intrinsically difficult to provide with the function of adjusting the intensity of light, the shutter 23 provided to carry out the aforementioned operation serves to achieve the pertinent function of adjusting the intensity of light.

According to the present embodiment as implemented in the optical disc drive 1, the photosensor 22 arranged to receive the pulsed laser beam L produces a detection signal, based upon which a synchronizing signal is generated so that the operation of the shutter 23 is synchronized with timing represented by the synchronizing signal. Therefore, the timing of the shutter 23 interrupting and resuming the emission of the pulsed laser beam L can be synchronized with the timing of pulsing of the pulsed laser beam L emitted from the laser 21. Moreover, the rotation cycle of the motor 32 is also synchronized with the timing of pulsing of the pulsed laser beam L emitted from the laser 21 as represented by the synchronizing signal, and thus the positions in which pits are to be formed can be adjusted precisely.

Although the exemplary embodiment of the present invention has been described above, the present invention is not limited to this embodiment, and may be carried out into practice in various other ways. Thus, it is contemplated that various modifications and changes may be made to the exemplary embodiment of the invention without departing from the scope of the embodiment of the present invention as defined in the appended claims.

For example, in describing the embodiment of the present invention, the optical disc 10 is adopted as one example of an optical storage medium. However, the optical storage medium applicable is not necessarily shaped like a disc; rather, a rectangular or card-type optical storage medium may be employed as the case may be. Moreover, the operation of scanning the optical storage medium with a pulsed laser beam may be carried out by causing at least one of the optical storage medium and the pulsed laser beam to be moved relative to each other. The direction of scanning may also not be limited to the specific embodiment described above in which the track is formed spirally; for example, the optical storage medium may be scanned with a pulsed laser beam along a track formed concentrically or in a zigzag. Furthermore, in cases where the pulsed laser beam is moved relative to the optical disc, the laser light source may be moved or the pulsed laser beam may be deflected for that purpose.

Figure 4D:
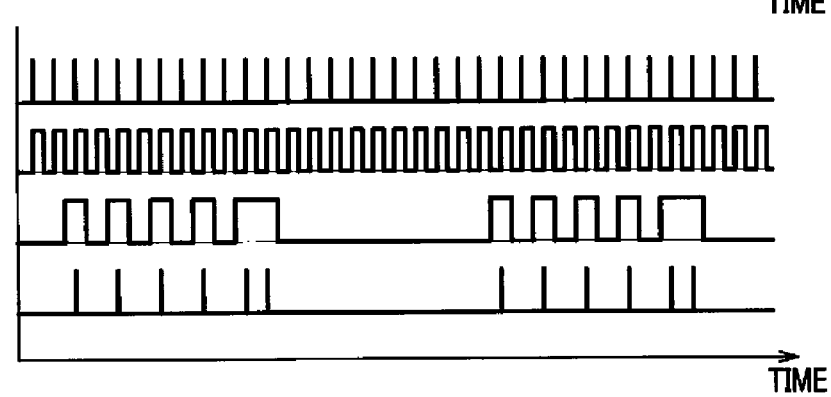
FIG. 4D is a graph showing waveforms of the detection signal output from the photosensor, the synchronizing signal, the shutter control signal, and the laser beam applied, as another example using a configuration modified from that of FIG. 4C with the intensity of illumination being approximately 50%.
Figure 5D:
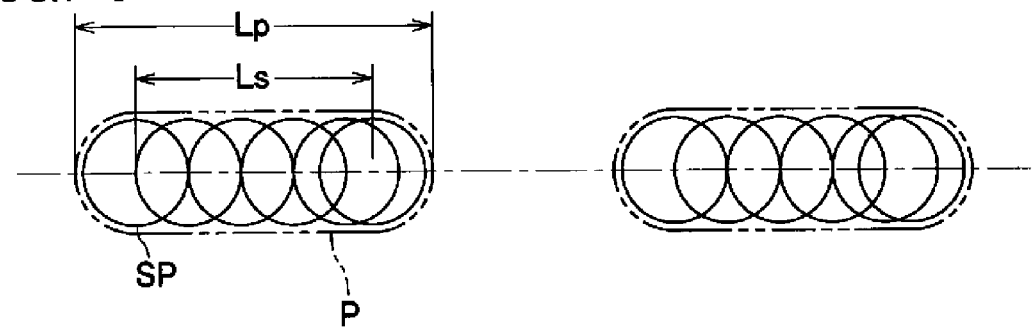
FIG. 5D is a diagram showing optically changed portions formed using a configuration modified from that used to form the optically changed portions shown in FIG. 5C with the intensity of illumination being approximately 50%.

In the above-described embodiment, as shown in FIGS. 5B and 5C, the last pulse in the pulses of the pulsed laser beam L emitted to form one pit P is canceled (interrupted) so that the illuminated spot SP which would otherwise be formed at the end (in the direction of scanning) of the track segment having the pit length of Lp is omitted. In order to ensure that all the pits have precisely the same pit length Lp, however, an alternative embodiment may be so conceived that the illuminated spot SP to be formed at the end (in the direction of scanning) of the track segment corresponding to one pit P should not be omitted by any means. For example, when the recording layer 12 is to be illuminated with an approximately 50% intensity of light to form each pit P, a shutter control signal as shown in FIG. 4D may be generated such that the last illuminated spot SP (located at the right end of the track segment) is added, as shown in FIG. 5D, to each track segment in the illumination pattern as shown in FIG. 5C.

It is also to be appreciated that the pattern of interruption of pulses of the pulsed laser beam in accordance with the practical embodiment of the present embodiment may not limited to the illustrated embodiment as described above.

In the above-described embodiment, the recording layer is configured to be changed from a state in which it has no fluorescing property to a state in which it has a fluorescing property, by illumination with light. However, the adjustment of the intensity of light applied to the recording layer may be practicably implemented in an alternative embodiment in which the method of recording information by making use of the reaction of removing a fluorescent dye or fluoresce is adopted.

What is claimed is:

1. A method for recording information as an array of optically changed portions arranged along a track in an optical storage medium, using a pulsed laser beam, the method comprising the steps of:

emitting the pulsed laser beam from a pulse laser toward the optical storage medium while causing at least one of the optical storage medium and the pulsed laser beam to be moved relative to each other, wherein a plurality of pulses of the pulsed laser beam are emitted during a time span in which one segment of the track having a length corresponding to a length of one optically changed portion is scanned with the pulsed laser beam; and using a shutter to adjust an intensity of light with which a segment of the track is to be illuminated to form each individual optically changed portion, such that the density of illuminated spots in each individual optically changed portion is changed by causing the shutter to selectively reduce the number of pulses of the pulsed laser beam with which the segment of the track is to be illuminated, wherein each of the illuminated spots is formed by one pulse of the pulsed laser beam, wherein the number of pulses is reduced based on a percentage determined in accordance with a specific intensity predetermined for the segment of the track corresponding to the individual optically changed portion.

2. The method according to claim 1, wherein the pulsed laser beam comprises ultrashort light pulses.

3. The method according to claim 1, further comprising the steps of:

receiving part of the pulsed laser beam emitted toward the optical storage medium to produce a detection signal; and generating a synchronizing signal based upon the detection signal, and wherein the adjusting step comprises causing the shutter to operate in synchronization with timing represented by the synchronizing signal.

4. The method according to claim 1, further comprising the step of retrieving light intensity information recorded in the optical storage medium, wherein the optical storage medium comprises a plurality of optical recording layers in which information is recordable and at least one intermediate layer each interleaved between adjacent optical recording layers, the light intensity information being a signal indicative of an intensity of light specified for each of the optical recording layers, and wherein the adjusting step comprises causing the shutter to be driven in accordance with the light intensity information retrieved from the optical storage medium.

5. The method according to claim 1, wherein information indicative of the predetermined specific intensity of light is recorded in the optical storage medium.

6. The method according to claim 1, further comprising:
prior to any information being recorded by the pulse laser on the optical storage medium, a step of reading from the optical storage medium, recorded light intensity information indicative of the predetermined specific intensity of light for each of plural recording layers;
a step of storing in memory the read light intensity information; and
a step of retrieving the stored light intensity information from the memory for use in controlling the shutter to adjust the intensity of light with which the segment of the track is to be illuminated to form each individual optically changed portion, such that the density of illuminated spots in each individual optically changed portion is changed by causing the shutter to selectively reduce the number of pulses of the pulsed laser beam with which the segment of the track is to be illuminated.

7. The method according to claim 6, wherein,
a ratio of a number of pulses not reduced to a total number of pulses emitted for each pit corresponds to a ratio indicated by the retrieved light intensity information.

8. An apparatus for recording information as an array of optically changed portions arranged along a track in an optical storage medium, the apparatus comprising:
a medium support member configured to support the optical storage medium;
a laser light source configured to emit a pulsed laser beam;
a scanning system configured to cause at least one of the medium support member, the laser light source and the pulsed laser beam emitted from the laser light source to be moved relative to each other, to move an illuminated spot in the optical storage medium supported by the medium support member;
a beam-condensing optical system configured to concentrate the pulsed laser beam emitted from the laser light source into the optical storage medium supported by the medium support member;
a shutter configured to interrupt and resume emission of the pulsed laser beam to adjust an intensity of light with which a segment of the track is to be illuminated to form each individual optically changed portion; and
a controller which comprises:
a shutter driver configured to drive the shutter; and
a light intensity adjuster configured to adjust the intensity of light with which the segment of the track is to be illuminated to form each individual optically changed portion, such that the density of illuminated spots in each individual optically changed portion is changed by causing the shutter driver to cause the shutter to selectively reduce the number of pulses of the pulsed laser beam with which the segment of the track is to be illuminated, wherein each of the illuminated spots is formed by one pulse of the pulsed laser beam, wherein the number of pulses is reduced based on a percentage determined in accordance with a specific intensity predetermined for the segment of the track corresponding to the individual optically changed portion.

9. The apparatus according to claim 8, wherein the laser light source comprises a pulsed laser configured to produce ultrashort light pulses.

10. The apparatus according to claim 8, further comprises:
a beam splitter configured to cause part of the light beam emitted from the laser light source to be deviated from a light path extending toward the optical storage medium supported by the medium support member; and
a photosensor configured to receive the part of the light beam deviated by the beam splitter to produce a detection signal,
wherein the controller further comprises a sync-generator configured to receive the detection signal from the photosensor and to generate a synchronizing signal based upon the received detection signal, and the shutter driver is configured to drive the shutter in synchronization with timing represented by the synchronizing signal generated by the sync-generator.

11. The apparatus according to claim 8, further comprising a retrieval optical system configured to retrieve light intensity information recorded in the optical storage medium, wherein the optical storage medium comprises a plurality of optical recording layers in which information is recordable and at least one intermediate layer each interleaved between adjacent optical recording layers, the light intensity information being a signal indicative of an intensity of light specified for each of the optical recording layers, and
wherein the shutter driver is configured to drive the shutter in accordance with the light intensity information retrieved from the optical storage medium.

12. A multi-layer optical storage medium comprising:
a substrate;
a plurality of optical recording layers in which information is recordable by the apparatus according to claim 8;
at least one intermediate layer each interleaved between adjacent optical recording layers; and
an area in which information indicative of the predetermined specific intensity of light for each of the optical recording layers is recorded.

13. The multi-layer optical storage medium according to claim 12, wherein the optical recording layers comprise an optical recording material that contains a two-photon absorption compound and a dye precursor, such that energy obtained through a two-photon absorption reaction by the two-photon absorption compound in response to illumination with light causes the dye precursor to be converted into a dye having a fluorescing property.

14. The apparatus according to claim 8, wherein information indicative of the predetermined specific intensity of light is recorded in the optical storage medium.

15. The apparatus according to claim 8, wherein,
the controller is configured so that prior to any information being recorded by the laser light source on the optical storage medium, i) to read from the optical storage medium, recorded light intensity information indicative of the predetermined specific intensity of light for each of plural recording layers, ii) to store in memory the read light intensity information, and iii) to retrieve the stored light intensity information from the memory for use in controlling the shutter driver to cause the shutter adjust the intensity of light with which the segment of the track is to be illuminated to form each individual optically changed portion, such that the density of illuminated spots in each individual optically changed portion is changed by causing the shutter to selectively reduce the number of pulses of the pulsed laser beam with which the segment of the track is to be illuminated.

16. The apparatus according to claim 15, wherein,
a ratio of a number of pulses not reduced to a total number of pulses emitted for each pit corresponds to a ratio indicated by the retrieved light intensity information.

* * * * *